(12) United States Patent
Howes

(10) Patent No.: US 8,863,641 B2
(45) Date of Patent: Oct. 21, 2014

(54) FLUID SERVO AND APPLICATIONS

(75) Inventor: Jonathan Sebastian Howes, Cambridge (GB)

(73) Assignee: Isentropic Ltd., Hampshire (GB)

( * ) Notice: Subject to any disclaimer, the term of this patent is extended or adjusted under 35 U.S.C. 154(b) by 967 days.

(21) Appl. No.: 12/995,823

(22) PCT Filed: Jun. 5, 2009

(86) PCT No.: PCT/GB2009/001411
§ 371 (c)(1),
(2), (4) Date: Feb. 25, 2011

(87) PCT Pub. No.: WO2009/147405
PCT Pub. Date: Dec. 10, 2009

(65) Prior Publication Data
US 2011/0150373 A1 Jun. 23, 2011

(30) Foreign Application Priority Data
Jun. 6, 2008 (GB) .................................. 0810391.3

(51) Int. Cl.
*F15B 13/02* (2006.01)
*F15B 15/22* (2006.01)
(Continued)

(52) U.S. Cl.
CPC . *F15B 9/08* (2013.01); *F16J 15/46* (2013.01); *F15B 15/149* (2013.01); *F15B 15/1452*
(Continued)

(58) Field of Classification Search
USPC ........ 91/47, 49, 399, 401, 405, 409; 277/464, 277/457, 465; 92/182
See application file for complete search history.

(56) References Cited

U.S. PATENT DOCUMENTS 3,194,055 A 7/1965 Knobel
3,386,346 A * 6/1968 Halpin ............................ 92/183
(Continued)

FOREIGN PATENT DOCUMENTS

| CN | 1092506 A | 9/2004 |
| CN | 1721712 A | 1/2006 |
| EP | 1435461 | 7/2004 |

OTHER PUBLICATIONS

Chinese Office Action in corresponding Chinese Patent Application No. 200980121986.5, Nov. 2, 2012, 5 pages.
(Continued)

*Primary Examiner* — Edward Look
*Assistant Examiner* — Daniel Collins
(74) *Attorney, Agent, or Firm* — Lempia Summerfield Katz LLC

(57) ABSTRACT

A fluid pressure operated actuator device, comprising: a body defining a first chamber (2) comprising an inlet in fluid communication with a pressurized fluid source (1); and a moveable element (5) mounted in the first chamber, the moveable element comprising an operative end (4) and partition means (3) configured to separate a first region of the first chamber comprising the inlet from a second region of the first chamber opposed to the first region during use of the device, the moveable element being moveable relative to the body between an extended configuration and a retracted configuration, with movement from the retracted configuration to the extended configuration occurring in response to a pressure differential across the partition means, wherein the actuator device includes a first passageway (7) for allowing passage of fluid from the pressurized fluid source to a second chamber (9) in the operative end of the moveable element, and a second passageway (8) for allowing passage of fluid from the second chamber to the second region of the first chamber, the operative end being configured to allow fluid in the second chamber to pass between the operative end and a target surface (6) when the moveable element is in the recessed configuration and being configured to abut the target surface when the moveable element is in the extended configuration in order to substantially restrict passage of fluid between the operative end and the target surface.

17 Claims, 10 Drawing Sheets

(51) Int. Cl.
*F16J 15/46* (2006.01)
*F15B 9/08* (2006.01)
*F16J 9/08* (2006.01)
*F16J 15/48* (2006.01)
*F15B 15/14* (2006.01)

(52) U.S. Cl.
CPC . (2013.01); *F16J 9/08* (2013.01); *F16J 15/48* (2013.01)
USPC .................................. 91/49; 91/401; 91/405

(56) References Cited

U.S. PATENT DOCUMENTS 3,678,809 A * 7/1972 Doutt ................................ 92/86
7,717,025 B2 * 5/2010 Webster et al. ................. 91/402
2006/0005696 A1 1/2006 Glisenti

OTHER PUBLICATIONS

International Preliminary Report on Patentability in International Patent Application No. PCT/GB2009/001411 dated Dec. 6, 2010, 6 pages.

UK Search Report in UK Application No. GB0810391.3 dated Jan. 28, 2009, 3 pages.

* cited by examiner

FLUID SERVO AND APPLICATIONS

RELATED APPLICATION DATA

This U.S. national phase application is based on International Application No. PCT/GB2009/001411, which was filed on Jun. 5, 2009, which claimed priority to British Patent Application No. 0810391.3, which was filed on Jun. 6, 2008. Priority benefit of these earlier filed applications is hereby claimed.

The present invention relates generally to a fluid pressure operated actuator device and applications thereof.

Servo systems using fluids, either liquid or gas, generally comprise an actuator with separate feedback and control elements, this results in an unavoidable complexity and tends to result in a high part count with attendant cost and reliability implications. Integration of actuation, feedback and control into a single entity has particular appeal in situations where it is desired to rapidly and forcefully move an element into close proximity to another element while not imposing significant load on the approached element.

This is of particular interest in the context of sealing applications where close running of a seal is required with either very low or zero contact force. The sealing of shafts and pistons against pressure loads or ingress of contaminants is generally achieved by a dedicated seal component such as a piston ring or a lip seal which relies on close contact between the seal and the surface to be sealed. This results in a friction penalty which may be severe and tends to become more severe as the pressure against which the seal has to act is increased. Direct contact seals are also prone to wear, in many cases this can produce a significant penalty in terms of maintenance cost and reliability.

Some alternatives to direct contact seals are available and include precise fitting of pistons as often found in small engines for use in model aircraft. This level of precision is difficult to achieve in anything above model scales and is very sensitive to thermal expansions. Where pressure sealing is not required labyrinth seals are often used. Although these have very low friction the seal achieved is best suited to exclusion of dust and they are not useful in applications where any significant adverse pressure gradient across the seal is present.

Dynamic rotary shaft seals have been created which utilise the motion of the shaft to pump against the pressure differential across the seal. These devices rely on motion to be effective and still suffer from start-up wear.

The present applicants have identified the need for an improved fluid servo system and novel applications thereof.

In accordance with a first aspect of the present invention, there is provided a fluid pressure operated actuator device, comprising: a body defining a first chamber comprising an inlet in fluid communication with a pressurised fluid source; and a moveable element mounted in the first chamber, the moveable element comprising an operative end and partition means configured to separate a first region of the first chamber comprising the inlet from a second region of the first chamber opposed to the first region during use of the device, the moveable element being moveable relative to the body between an extended configuration and a retracted configuration, with movement from the retracted configuration to the extended configuration occurring in response to a pressure differential across the partition means; wherein the actuator device includes a passageway for allowing passage of fluid from the pressurised fluid source to a second chamber in the operative end of the moveable element, the operative end being configured to allow fluid in the second chamber to pass between the operative end and a target surface when the moveable element is in the recessed configuration and being configured to abut the target surface when the moveable element is in the extended configuration in order to substantially restrict passage of fluid between the operative end and the target surface.

In this way, an actuator device is provided in which a feedback pressure is provided when the moveable element is in the extended configuration. The partition means may be configured to substantially seal the first region from the second region. The partition means may be spaced (e.g. longitudinally spaced) from the operative end. The actuator device may be a linear actuator device. The pressurised fluid supply may be a pressurised liquid or a gas supply. The pressurised fluid supply may comprise a single source or a separate sources supplying the first and second chambers respectively.

The actuator device may further comprise biasing means for biasing the moveable element in the retracted configuration during normal operation of the device (e.g. biasing means providing a permanent biasing action when the device is in use). In this way, the actuator device may be configured to maintain a retracted position until pressure in the first region reaches a predetermined level. When applied to a pressure seal, this mechanism advantageously provides a pressure-activated sealing action. Furthermore, the use of biasing means in this way acts to reduce the backpressure load on the target surface.

The biasing means may in use provide a biasing pressure (or range of biasing pressures) on the moveable element which is less than (e.g. significantly less than) the fluid pressure in the first region of the first chamber. In this way, biasing means of very low strength may be used to provide a light back-off pressure as the fluid pressures either side of the partition means. When used in combination a high fluid pressure source, the moveable element may be configured to move rapidly from the retracted configuration to the extended configuration when activated and to provide a very fine running gap between the operative end and the target surface when in use.

The biasing means may provide a biasing force which increases as the moveable element moves from the retracted configuration to the extended configuration. In this way, biasing means is provided which will initially be strongly overpowered by fluid pressure in the first region of the chamber resulting in swift positive movement of the operative end towards the target surface, and which provides an increasingly dominant force as feedback pressure progressively increases to counter fluid pressure in the first region. As a result, a very fine degree of separation can be achieved between the target surface and the operative end of the device which, particularly in a sealing context, is of benefit in reducing unwanted leakage past the target surface. The biasing means may comprise resilient mean (e.g. a spring). In the case of a flexible membrane, the resilient means may comprise a lantern spring.

The passageway may be configured to provide fluid to the second chamber at reduced pressure relative to fluid in the first region. For example, the passageway may comprise a restricted flow path for reducing pressure at an outlet of the passageway.

In one embodiment, the first chamber comprises a cylinder and the partition means comprises a piston moveable in the cylinder between an extended position and a recessed position, with the operative end of the moveable element being connected (e.g. rigidly) to the piston by a shaft. The first and second passageways may extend through the shaft.

In another embodiment, the moveable element comprises a flexible membrane. For example, the moveable element may comprise a flexible membrane configured to radially expand as the membrane moves between a non-planar configuration (the recessed configuration) to a more planar configuration (the extended configuration).

The passageway may be configured to provide fluid from the first region of the first chamber to the second chamber.

The device may comprise a further passageway for allowing passage of fluid from the second chamber to the second region of the first chamber. The first-mentioned passageway may provide a path for fluid which is restricted relative to the further passageway. By varying the amount the first-mentioned passageway is restricted relative to the further passageway, the degree of separation between the operative end and the target surface may be controlled. Advantageously, the provision of the further passageway acts to increase the tolerance of the device to pressure variations (e.g. in the fluid source). One or more of the first-mentioned and further passageways may extend through the moveable element.

In another embodiment, the actuator device may comprise a further moveable element as previously defined, with the (first) passageway of the further moveable element being in fluid communication with the second region of the first chamber of the first-recited moveable element.

In one embodiment, the operative end of the moveable element is configured to provide a sealing action against the target surface. In this way, an improved sealing mechanism is provided.

In another embodiment, the operative end of the moveable element is configured to provide a bearing surface.

In yet another embodiment, the operative end of the moveable element is configured to provide a sensor. For example, the operative end may be configured to provide a position sensor.

In accordance with a second aspect of the present invention, there is provided a mechanism for sealing a first part relative to a second part, the mechanism comprising a an actuator device as previously defined, the actuator device having an operative end configured to provide a sealing action. In the case of a sealing mechanism comprising actuator devices with biasing means as previously defined, the sealing mechanism may be configured to provide a pressure-activated sealing action.

The operative end may extend along a periphery of the sealing mechanism (e.g. in a circular loop arrangement). The second chamber may comprise a continuous groove extending along the operative end.

In accordance with a third aspect of the present invention, there is provided a bearing mechanism comprising an actuator device as previously defined, the actuator having an operative end configured to provide a bearing surface. The operative end may extend along a periphery of the bearing mechanism (e.g. in a circular loop arrangement). In another embodiment, the bearing mechanism may comprise at a further actuator device as previous defined, the further actuator being spaced from the first-mentioned actuator device. The first-mentioned and further actuator devices may be positioned on opposed lateral sides of a rotatable body.

Embodiments of the invention will now be described by way of example with reference to the accompanying drawings in which.

For the sake of simplicity, in the drawings features in common between different embodiments are provided with the same reference number (e.g. 3, 3', 3").

Figure 1:
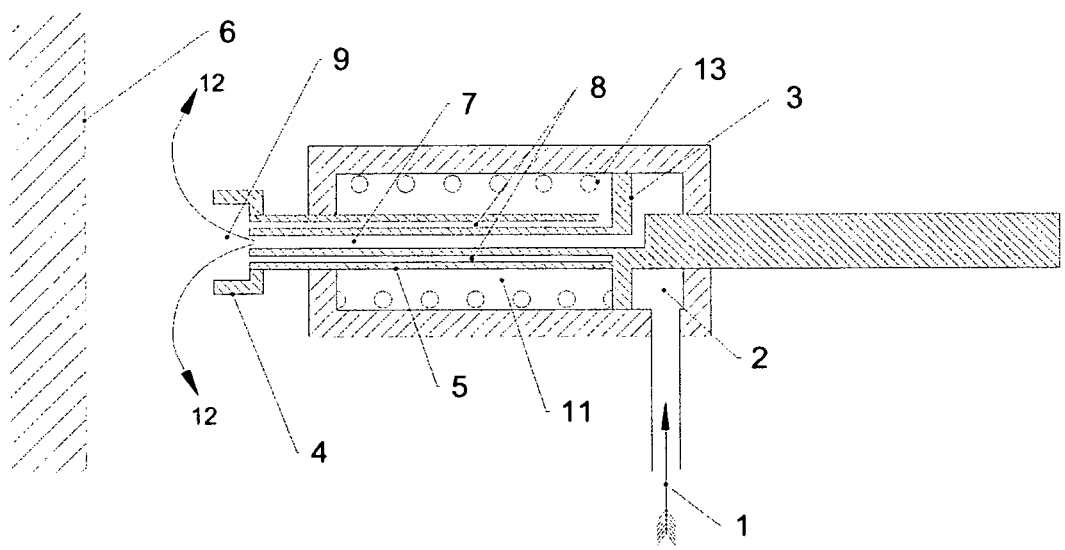
FIG. 1 shows a schematic cross-sectional view of an actuator device in accordance with a first embodiment of the present invention in a retracted configuration.
Figure 2:
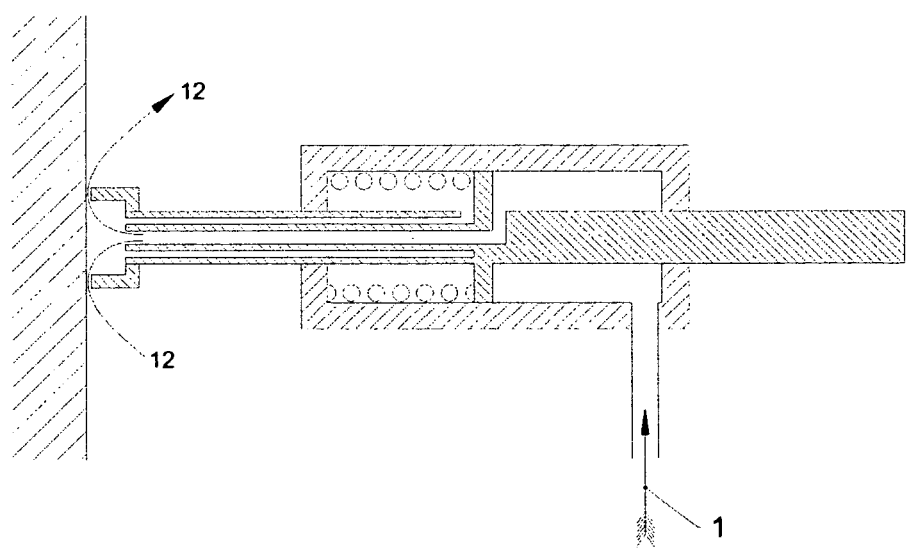
FIG. 2 shows a schematic cross-sectional view of the actuator device of FIG. 1 in an extended configuration with the sensing element in close proximity to the target component.

FIGS. 1 and 2 show a pneumatic or hydraulic actuator/servo device in which the actuation force is provided by a pressurised fluid source (1) which is directly connected to an actuation space (2) and acts on a piston or other actuation surface (3) and forces a sensing means (4) via a spindle rod (5) towards a target component (6). The spindle rod (5) contains two fluid passages (7)(8). One passage, the leakage path (7), connects the actuation space (2) with an open chamber or cavity (9) within a sensing element (4), a second passage (8) connects the sensing element (4) cavity (9) with an opposing pressure space (11) which acts on the opposite side of the piston or actuation surface (3) to the actuation space (2). Leakage path (7) defines a restricted flow path to provide fluid at cavity (9) at reduced pressure relative to fluid in the actuation space (2) which is at the (full) supply pressure. The degree of restriction in the leakage path (7) dictates the size of stable gap established between the target component (6) and sensing means (4).

When the sensing element is not in close proximity to the target component (6) as shown in FIG. 1, the leakage of fluid passing through the leakage path (7) vents (12) from the sensing cup cavity (9) and does not cause a significant pressure rise within the sensing element. When the sensing element closely approaches the target component (6) as shown in FIG. 2, the path taken by the leaking fluid (12) becomes restricted and the pressure within the sensing element cavity (9) rises. Since the sensing element cavity is in communication with the opposing pressure space (11) via the second passage (8) the pressure in this space rises reducing the pressure differential across the piston or actuation surface (3) thus reducing the force with which the sensing element is projected towards the target component (6). A spring (13) or other means of force generation not sensitive to the pressure differential across the piston or actuation surface is also present and configured to act to load the sensing element away from the target component such that a balance of forces may only be achieved when the piston or actuation surface is at its limit of travel or when the pressure in the sensing element cavity, communicated to the opposing pressure space combined with the force of the spring (13) or other means of force generation not sensitive to the pressure differential across the piston or actuation surface is in equilibrium with the pressure force acting on the piston or actuation surface from within the actuation space. When unpressurised the spring holds the sensing element away from the target component.

Figure 3:
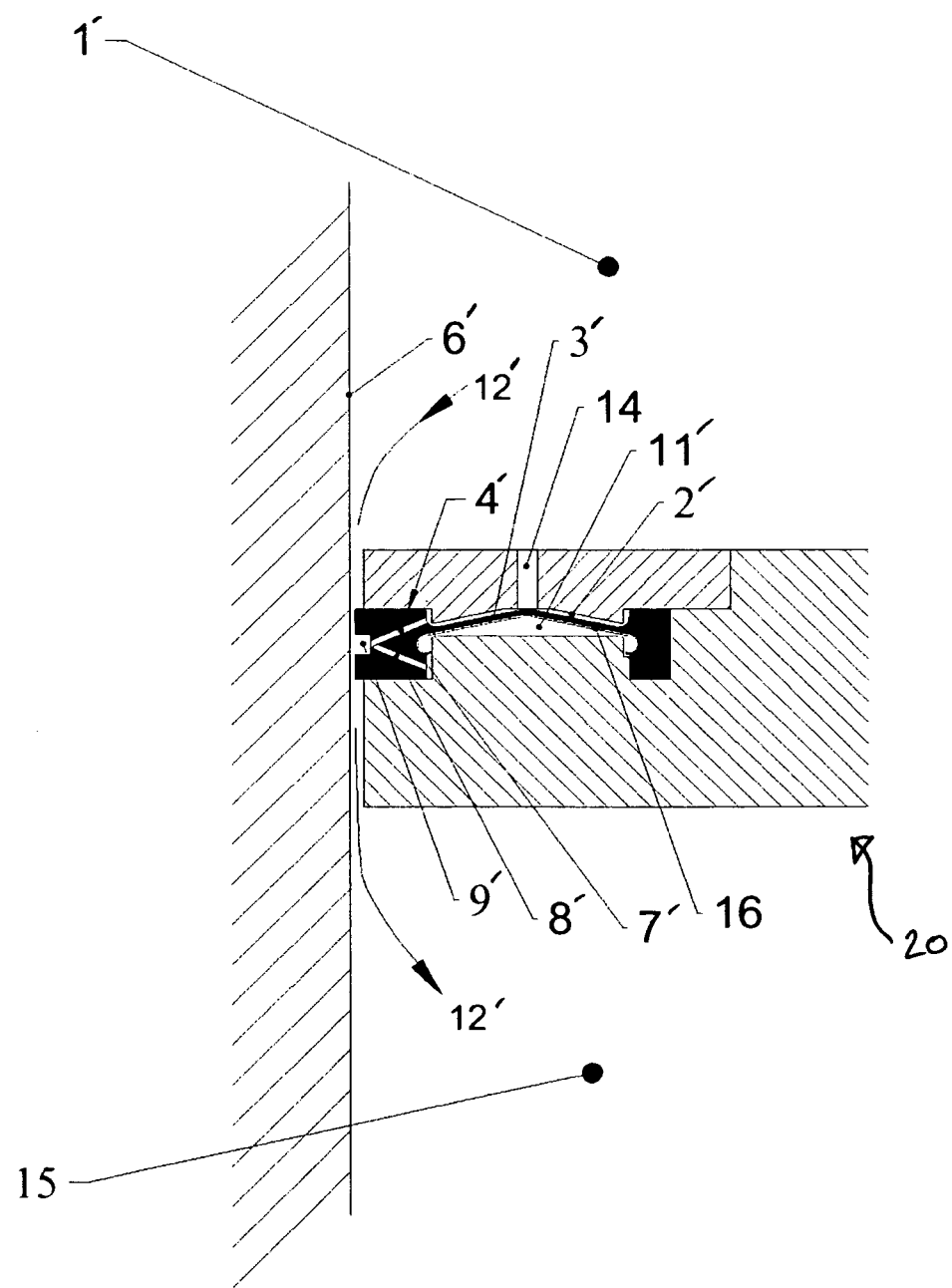
FIG. 3 shows a schematic cross-sectional view through one side of a seal comprising an actuator device in accordance with a second embodiment of the present invention in an un-pressurised configuration.
Figure 4:
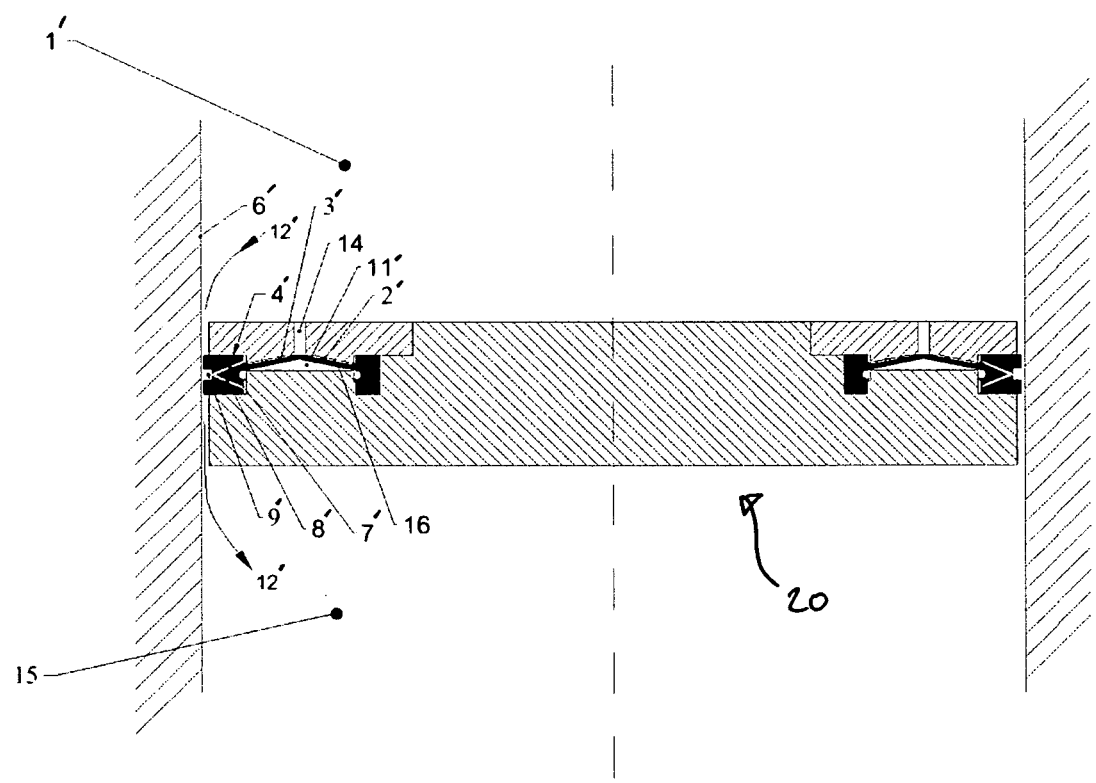
FIG. 4 shows a schematic cross-sectional view through the seal of FIG. 3.
Figure 5:
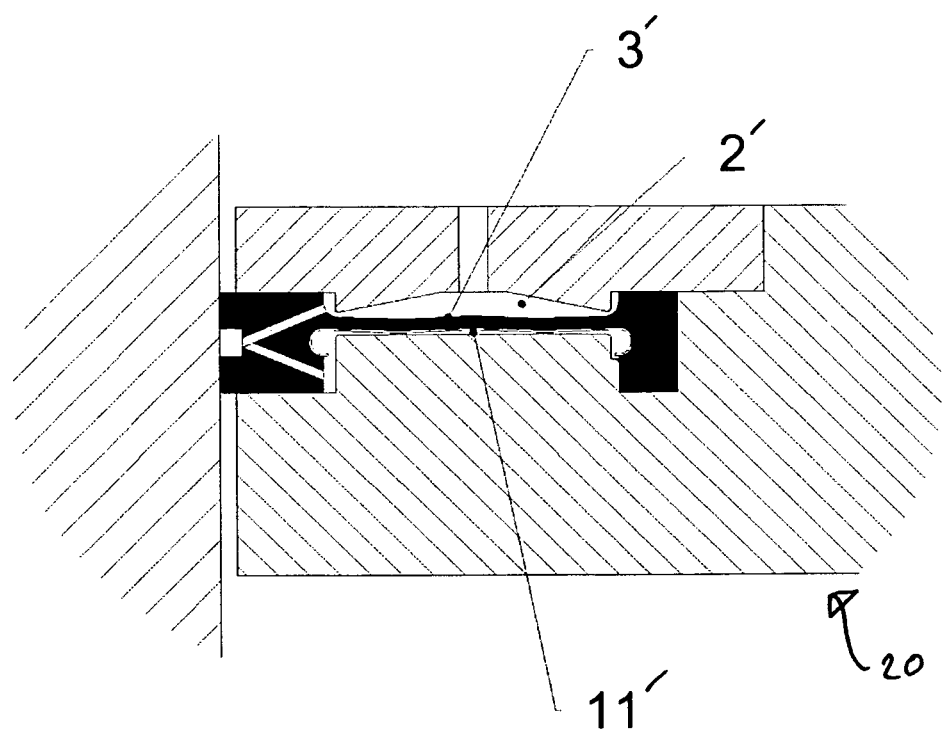
FIG. 5 shows a schematic cross-sectional view through the seal of FIG. 3 and its housing in a pressurised configuration.

FIGS. 3-5 show a section of a piston sealing device (20) in which the pressurised fluid source (1') is now the gas or liquid above the piston which communicates with the actuation space (2') via the duct (14) and acts on the actuation surface (3') which in this application may be configured as a non-planar membrane such that imposition of a pressure differential causes it to flatten and hence to expand radially and so directly force a sensing and sealing means (4') towards a target component, in this case the cylinder wall (6'). Since the pressurised fluid source is the fluid to be processed by the piston, operation of the seal (20) may advantageously be pressure-activated.

The sensing and sealing means carries an annular groove which acts as the sensing element cavity (9'), which may be sub divided into a number of radial sections or may be one continuous groove and is in communication with the actuation space via a duct or series of ducts which form an element of the leakage path (7') and via a second separate duct (8') is in communication with an opposing pressure space (11') which acts on the opposite side of the actuation surface (3'). When the sensing and sealing element is not in close proximity to the cylinder wall (6') the leakage of fluid passing through the leakage path (7') and directly through the annular gap defined by the sensing and sealing element and the cylinder wall vents (12') to the lower pressure space (15') below the piston and does not cause a significant pressure rise within the sensing and sealing element cavity. When the sensing and sealing element closely approaches the cylinder wall the path taken by the leaking fluid becomes restricted and the pressure within the sensing cavity rises. Since the sensing cavity is in communication with the opposing pressure space (11') via the second duct (8') the pressure in this space also rises reducing the pressure differential across the piston or actuation surface (3') thus reducing the force with which the sensing and sealing unit is projected towards the cylinder wall (6'). A lantern spring (16) is positioned to stiffen the actuation surface and to hold the seal (20) away from the cylinder wall when unpressurised.

When pressurised equilibrium is achieved when the pressure in the sensing and sealing element cavity and hence in the opposing pressure space rises such that the differential between the actuation space and the opposing pressure space results in a reduced radial force on the sensing and sealing element in the direction of the cylinder wall such that the spring load is sufficient to hold the seal face a small distance from the wall. Since contact with the wall will result in the opposing space pressure equaling the actuation pressure and hence zero pressure differential and a large sealing gap will result in a large differential it is clear that an equilibrium condition can be arranged such that a very small sealing gap is created without significant contact between the seal and the wall.

The seal (20) in the pressurised and fully deflected form is shown in FIG. 5. In this figure it can be observed that the actuation surface (3') is deflected by the pressure differential between the actuation space (2') and the opposing pressure space (11'), the spring (16) being deflected in the same manner by contact with the actuation surface.

Figure 6:
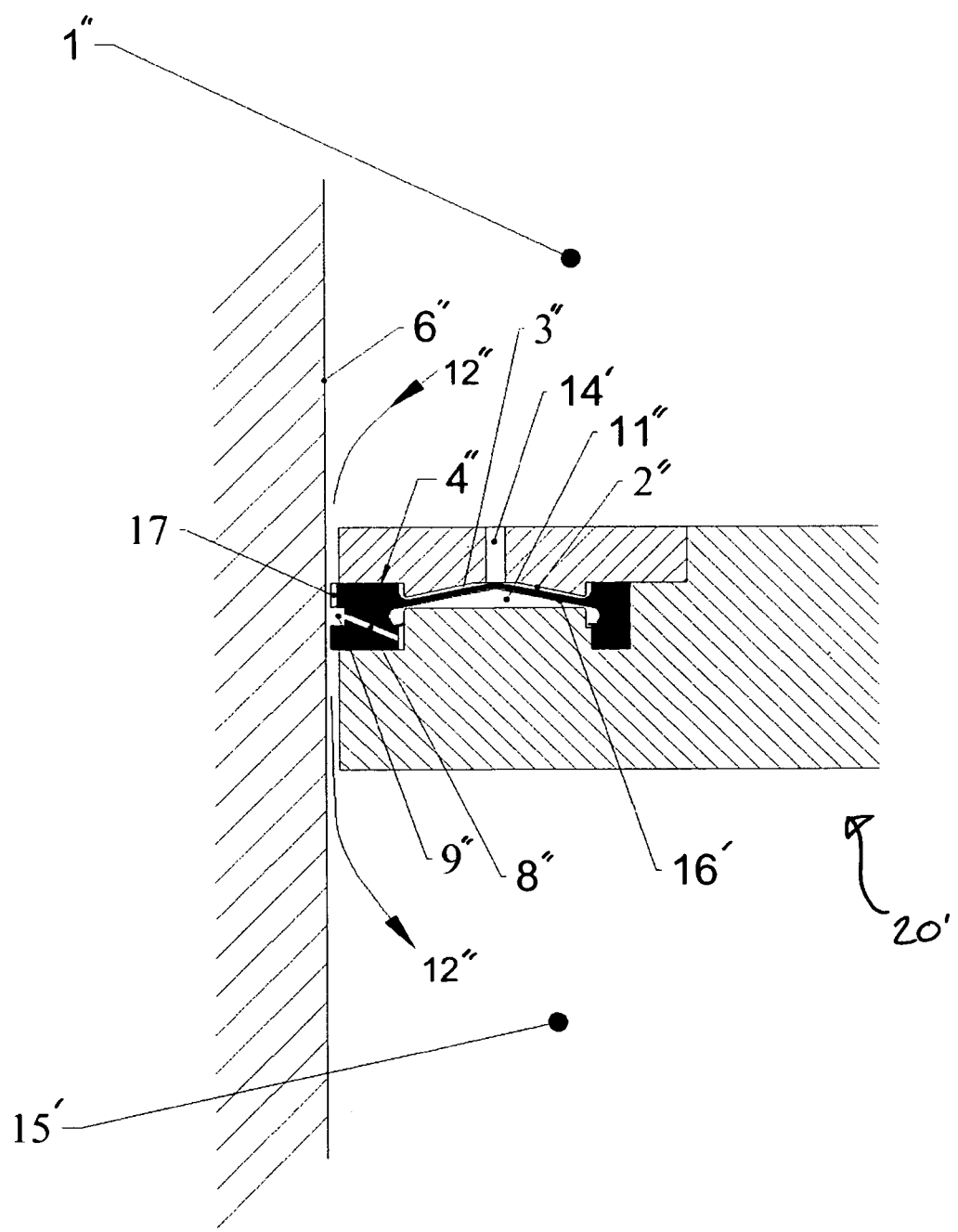
FIG. 6 shows a schematic cross-sectional view through a section of a seal comprising an actuator device in accordance with a third embodiment of the present invention.

FIG. 6 shows a section of another piston sealing device (20') based on the device of FIG. 3 but with the duct forming the leakage path (7' in FIG. 3) formed as a channel (17), or series of channels in the sealing face of the sensing and sealing element which run between the pressure side of the seal assembly and the sensing element cavity. This configuration may prove to be of simpler manufacture particularly when the seal is moulded from a plastic or elastomer. Omission of a leakage path will result in possible locking of the seal against the sealing surface as no flow path will then exist between the opposing pressure space and the sensing cavity.

Figure 7:
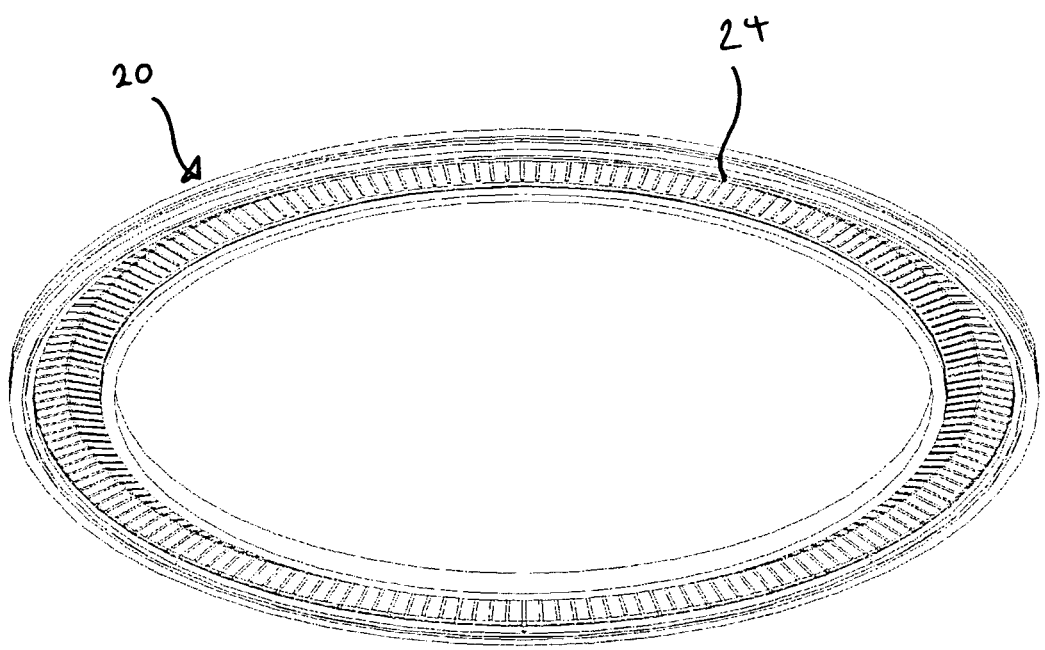
FIG. 7 shows a schematic perspective view of the seal of FIG. 3.

FIG. 7 shows an overall view of piston seal (20) defining a continuous sealing surface around the periphery of the seal. It should be noted that the seal (20) may also be configured to seal a sliding or rotating shaft. In shaft sealing applications where a substantial pressure difference across the seal (20) is not available one configuration will be to install two seals back to back such that the intermediate space may then be pressurised and the seals so activated. As the use of this sealing technique requires a small leakage it is particularly suited to situations where the whole assembly operates within one fluid such that the consequences of leakage are insignificant. This makes the concept particularly applicable to sealing shafts in a marine environment and to pistons and actuators operating in air or using a non-hazardous gas.

Figure 8:
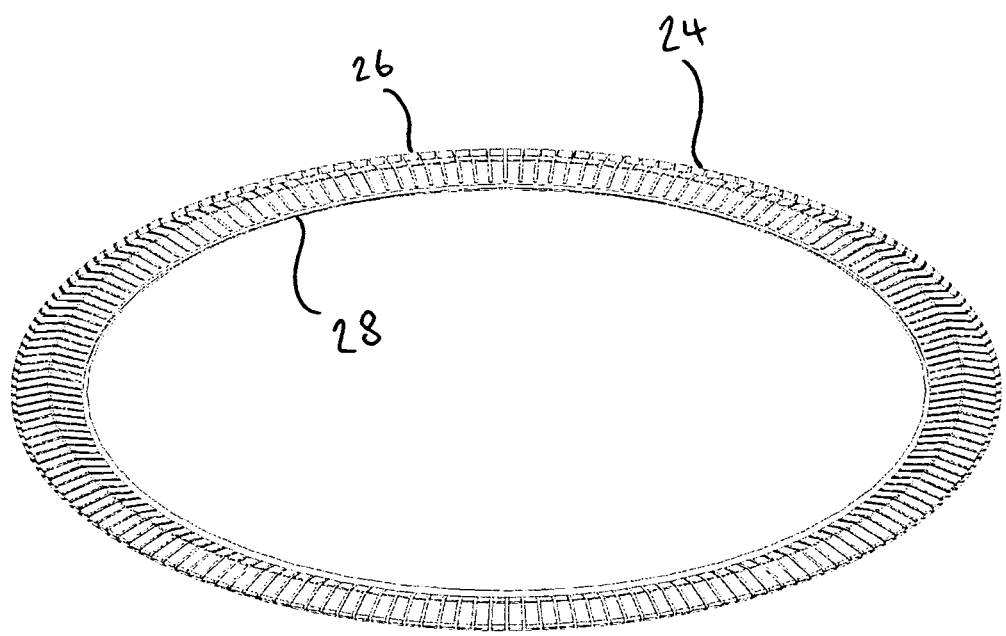
FIG. 8 shows a schematic perspective view of a seal spring of the seal of FIG. 3 in isolation.

Piston seal (20) includes a substantially annular seal lantern spring (24) as shown most clearly in FIG. 8. Lantern spring (24) backs the actuation surface and resists deflection under pressure such that the radial force generated by the spring forces is in the sense of puling the sealing face away from the sealing surface. A proposed configuration is shown in which the ring created by the spring (24) is formed in to a vee channel section and is cut in to a set of radial segments (26) joined by a continuous ring (28) on the inner edge. This construction allows deflection to reduce the vee of the channel without developing high hoop stresses which would make the spring excessively stiff.

Figure 9:
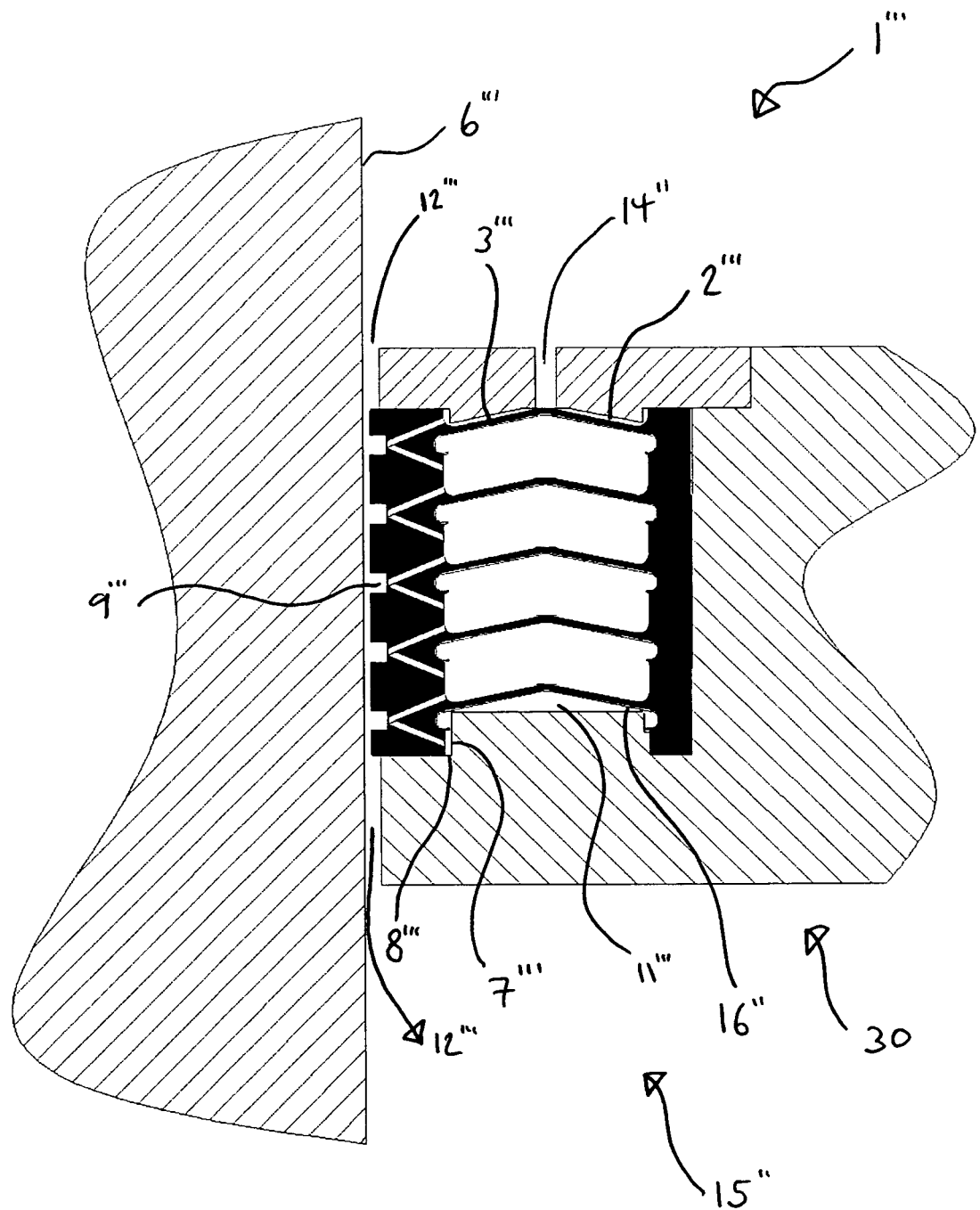
FIG. 9 shows schematic cross-sectional view of a multi-layer seal comprising an actuator device in accordance with another embodiment of the present invention.

FIG. 9 shows another configuration of the piston seal device (30) in which a multi-layer construction is used. In this form the leakage path (7''') of each successive element is pressurised from the opposing pressure space of the seal above. This construction will allow for a progressive pressure gradient across the seal stack and may be found to be advantageous when a lower leakage rate is desired.

Figure 10:
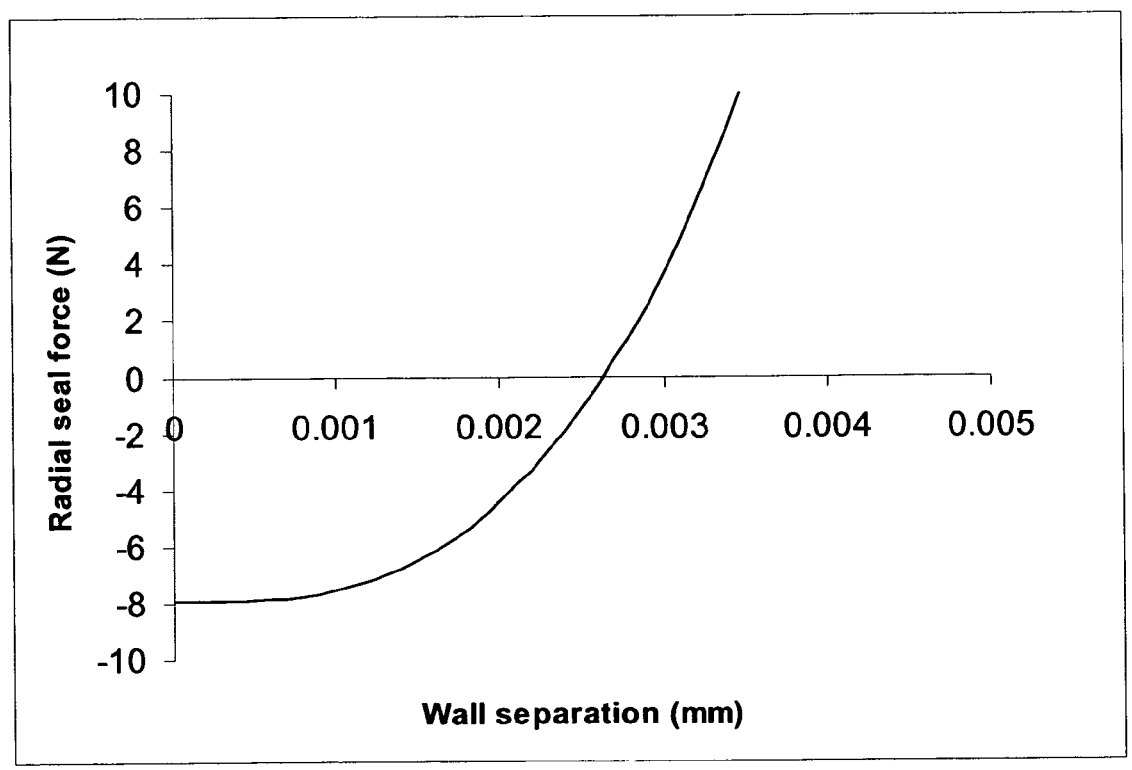
FIG. 10 is a graph showing the radial force on a seal with separation from the wall against which it is to create a seal.

FIG. 10 shows a graph of radial force on a seal in accordance with the present invention with separation form the sealing surface. It will be seen that the force is negative (ie, away from the sealing wall) when the seal is in contact with the wall and becomes positive (ie, towards the sealing face wall) as the distance is increased. This illustrates that the force-distance relationship is both stable and has an equilibrium condition when very close to the wall. As an illustration, the graph of FIG. 10 relates to a seal with the following characteristics:

| | |
|---|---|
| Seal diameter: | 110 mm |
| Radial spring rate: | 20 N/mm |
| Pressure on high pressure side: | 30 bar |
| Pressure on low pressure side: | 1 bar |

The seal gap resulting from this configuration is 2.6 microns and the resulting leakage rate is 0.13 liters/sec of air at 1 bar.

Since a seal configured in this manner will always stabilise with a small gap between the seal and the sealing face it will also find application as a bearing. Gas bearings currently require very high precision to work effectively and the precision of a bearing constructed in accordance with the principles of the current invention will be very much less critical since the bearing will adapt to the surface against which it is to operate.

Advantages of the Invention

The actuation principle provides a very simple means of giving a servo component a sense of feel. This may be of particular use in robotics and also tooling in which it is required to follow a template or cam of modest strength while providing an output motion of very high stiffness while not imposing high loads on the controlling mechanism or other positional input device.

When configured as a seal, since no, or minimal contact between the seal and the surface to be sealed will occur very low friction and wear will result. This has great significance when high reliability, long service life and low maintenance are important. Since the low friction also implies high mechanical efficiency this is also of significance in reducing the energy consumption of machines in general when used both as a seal and a bearing.

The responsive, servo action of the seal also reduces the need for extreme precision between seal and bore or shaft and seal with the potential for significant cost savings.

While seals and bearings for most low temperature applications will be suited to manufacture from polymer elastomers, the same principle may be applied to much stiffer materials such as metals or ceramics if the initial fit of parts is achieved to higher precision such that the deflections necessary to correct function are reduced to a level appropriate to the material properties. If very stiff materials are used configurations such as split sealing rings, convoluted sealing rings etc may be employed. By these means the invention may be used as a low friction, low wear piston ring for engine applications.

The invention claimed is:

1. A fluid pressure operated actuator device, comprising:
    a body defining a first chamber comprising an inlet in fluid communication with a pressurised fluid source; and
    a moveable element mounted in the first chamber, the moveable element comprising an operative end and partition configured to separate a first region of the first chamber comprising the inlet from a second region of the first chamber opposed to the first region during use of the device, the moveable element being moveable relative to the body between an extended configuration and a retracted configuration, with movement from the retracted configuration to the extended configuration occurring in response to a pressure differential across the partition;
    wherein the actuator device includes a first passageway for allowing passage of fluid from the pressurised fluid source to a second chamber in the operative end of the moveable element, and a second passageway for allowing passage of fluid from the second chamber to the second region of the first chamber, the operative end being configured to allow fluid in the second chamber to pass between the operative end and a target surface when the moveable element is in the recessed configuration and being configured to abut the target surface when the moveable element is in the extended configuration in order to substantially restrict passage of fluid between the operative end and the target surface.

2. An actuator device according to claim 1, wherein the actuator device further comprises a biasing mechanism for biasing the moveable element in the retracted configuration.

3. An actuator device according to claim 2, wherein the biasing mechanism provides a biasing force which increases as the moveable element moves from the retracted configuration to the extended configuration.

4. An actuator device according to claim 1, wherein the partition is configured to substantially seal the first region from the second region.

5. An actuator device according to claim 1, wherein the first chamber comprises a cylinder and the partition comprises a piston moveable in the cylinder between an extended position and a recessed position, with the operative end of the moveable element being connected to the piston by a shaft.

6. An actuator device according to claim 1, wherein the moveable element comprises a flexible membrane.

7. An actuator device according to claim 1, wherein the moveable element comprises a flexible membrane configured to radially expand as the membrane moves between a non-planar configuration to a more planar configuration.

8. An actuator device according to claim 1, comprising a further moveable element, with a first passageway of the further moveable element being in fluid communication with the second region of the first chamber of the first-recited moveable element.

9. An actuator device according to claim 1, wherein the operative end of the moveable element is configured to provide a sealing action against the target surface.

10. An actuator device according to claim 1, wherein the operative end of the moveable element is configured to provide a bearing surface.

11. An actuator device according to claim 1, wherein the operative end of the moveable element is configured to provide a sensor.

12. An actuator device according to claim 1, wherein the operative end is configured to provide a position sensor.

13. An actuator device according to claim 1, wherein a mechanism for sealing a first part relative to a second part comprises the actuator device, the actuator device having an operative end configured to provide a sealing action.

14. An actuator device according to claim 13, wherein the operative end of the actuator device extends along a periphery of the sealing mechanism.

15. An actuator device according to claim 14, wherein the second chamber comprises a continuous groove extending along the operative end of the actuator device.

16. An actuator device according to claim 1, wherein a bearing mechanism comprises the actuator device said actuator device having an operative end configured to provide a bearing surface.

17. A bearing mechanism comprising:
    first and second fluid pressure operated actuator devices, each of the first and second actuator devices comprising:
        a body defining a first chamber comprising an inlet in fluid communication with a pressurised fluid source; and
        a moveable element mounted in the first chamber, the moveable element comprising an operative end and partition configured to separate a first region of the first chamber comprising the inlet from a second region of the first chamber opposed to the first region during use of the device, the moveable element being moveable relative to the body between an extended configuration and a retracted configuration, with movement from the retracted configuration to the extended configuration occurring in response to a pressure differential across the partition;
    wherein each of the first and second actuator devices includes a first passageway for allowing passage of fluid from the pressurised fluid source to a second chamber in the operative end of the moveable element, and a second passageway for allowing passage of fluid from the second chamber to the second region of the first chamber, the operative end being configured to allow fluid in the second chamber to pass between the operative end and a target surface when the moveable element is in the recessed configuration and being configured to abut the target surface when the moveable element is in the extended configuration in order to substantially restrict passage of fluid between the operative end and the target surface, and wherein the first actuator device has an operative end configured to provide a bearing surface, and wherein said first and second actuator devices are positioned on opposed lateral sides of a rotatable body.

* * * * *